Oct. 23, 1934.                R. K. LEE ET AL                1,977,681
                                 PROPELLER
                    Filed Sept. 19, 1932    2 Sheets-Sheet 1
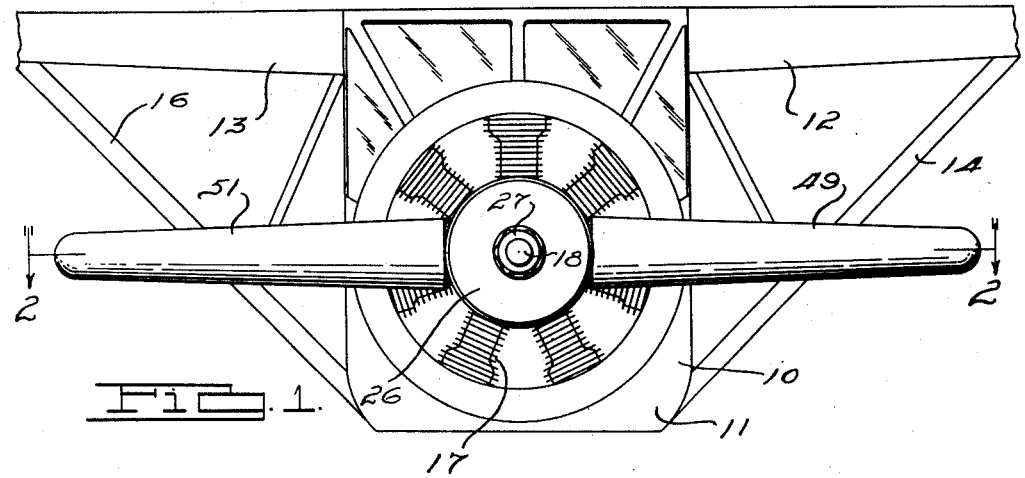
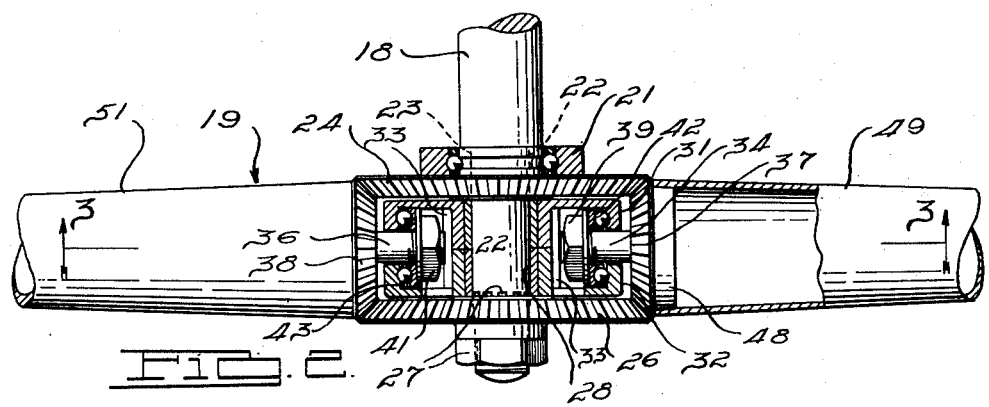
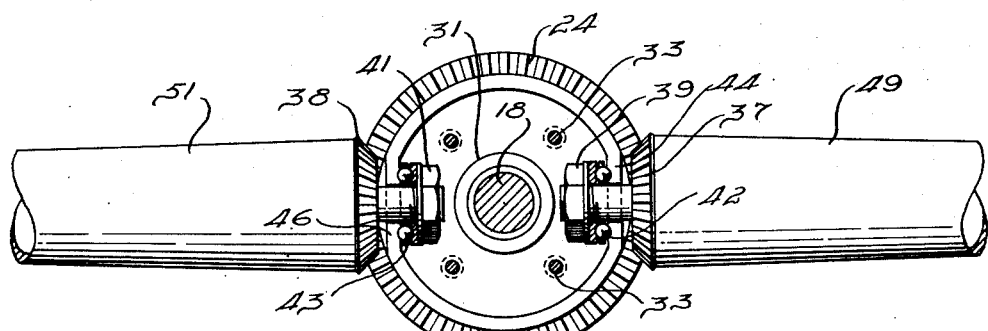
INVENTORS.
Roger K. Lee,
Edward F. Zaparka.
BY
Harness, Dickey, Pierce & Hann
ATTORNEYS.

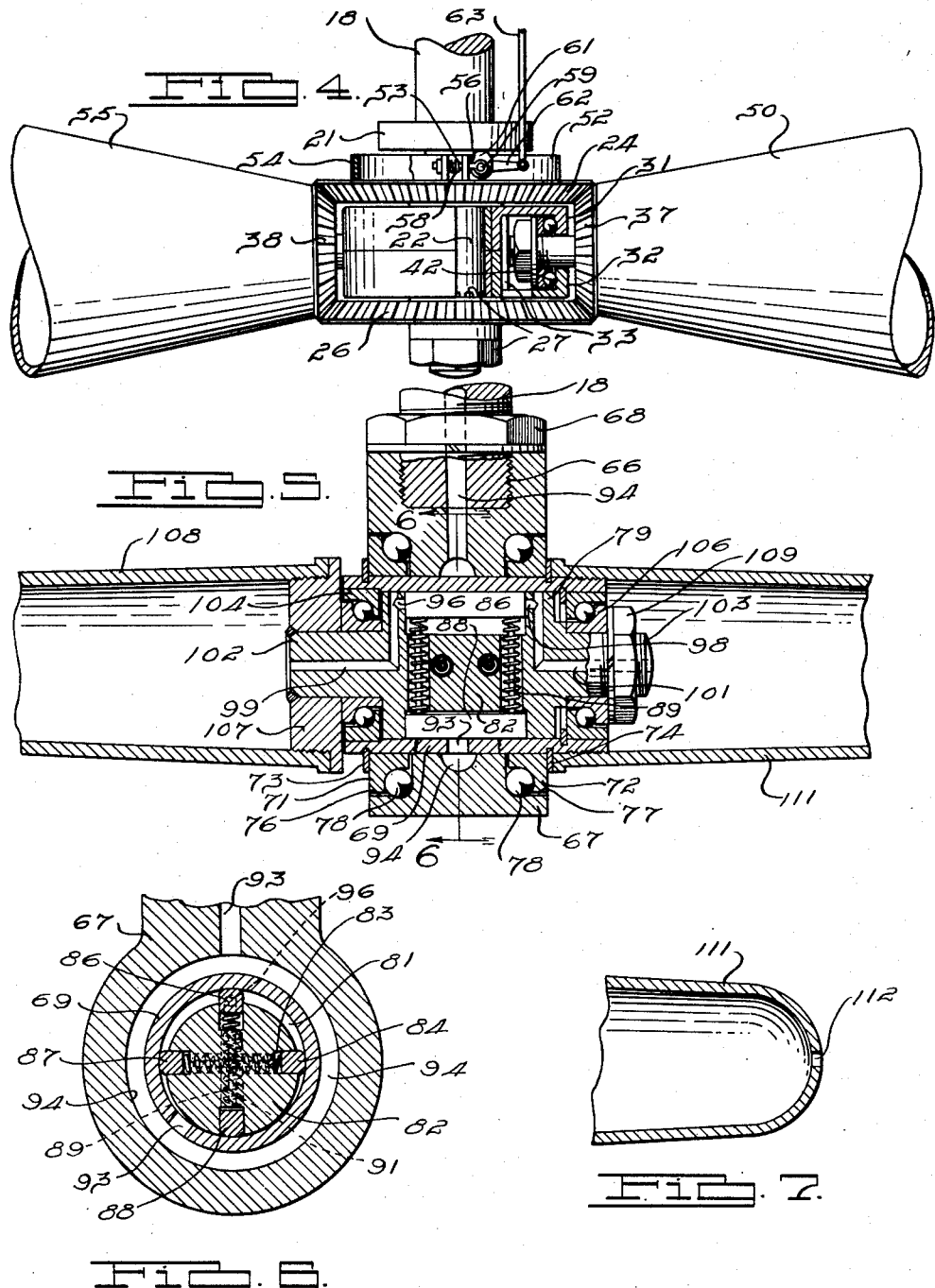

Patented Oct. 23, 1934

1,977,681

UNITED STATES PATENT OFFICE 1,977,681

PROPELLER

Roger K. Lee, Highland Park, Mich., and Edward F. Zaparka, Baltimore, Md.

Application September 19, 1932, Serial No. 633,802

12 Claims. (Cl. 170—159)

This invention relates to devices for propelling bodies through the air or other fluid substance and has particular relation to a combination driving and propeller mechanism adaptable for employment on aircraft.

An object of the invention is to provide a propeller having blades of circular cross-sectional contour and designed to revolve about an axis perpendicular thereto, and to rotate about axes coincidental with the blades.

Another object of the invention is to provide a propeller mechanism capable of taking advantage of the lateral force resulting from the rotation of a cylindrical body in a moving current of air and of creating such relatively moving current of air by the rotation of the propeller about an axis perpendicular thereto.

Another object of the invention is to provide a propeller capable of rotating at any desired speed less than engine speed and thus to make possible an increase in the useful load on an aircraft by the employment of a relatively light high speed engine capable of developing a larger number of horse power per pound of engine weight than the relatively slow speed engines which can now be employed in aircraft propulsion.

Another object of the invention is to provide a propeller capable of being operated at higher speed than the propellers now employed and which is otherwise suitable for employment where it is desired to obtain relatively large pull in an aircraft or elsewhere where only a propeller having short bades can be employed.

Another object of the invention is to provide a propller having a high efficiency at low aircraft speed whereby a greater pull will be available to provide a quick take-off from the ground.

Another object of the invention is to provide an aircraft propeller which can be adjusted manually during the operation thereof to effect results equivalent to that of a manually controllable variable pitch propeller.

Another object of the invention is to provide a propeller having means associated therewith by which the rate of rotation of the propeller can be varied relative to the rate of rotation of the engine by which it is driven.

Another object of the invention is to provide a propeller having blades rotatable about axes internally thereof and revoluble about an axis externally thereof.

Another object of the invention is to provide a propeller capable of rotating around an axis transversely thereto at a constant speed less than engine speed and with the blades thereof rotating about their longitudinal axes at a constant rate inversely proportional to the rate of revolution of the blades about the transverse axis.

Another object of the invention is to provide a propeller having blades revolving about a transverse axis at variable speeds less than engine speed and with the blades rotating about their own longitudinal axes at variable speeds inversely proportional to the rate of revolution of the blades about the aforesaid transverse axis.

Another object of the invention is to provide a propeller capable of rotating about an axis disposed transversely with respect to the blades thereof, at engine speed and with each of the blades rotating about its own longitudinal axis at speeds capable of variation independently of the rate of revolution of the blades about said transverse axis.

The invention generally involves the provision of a propeller designed to take advantage of the so-called Magnus-effect or, in other words, the effect of the lateral force resulting from the rotation of a cylinder in a moving current of air. A rotating cylinder carries with it a stratum of air adjacent thereto, which on one side of the rotating cylinder causes an increase in the air velocity on that side and a decrease in pressure or a partial vacuum, whereas on the opposite side of the cylinder the air stratum and the air of the air current, which are oppositely directed, impinge upon one another and create an excessive amount of turbulent motion which causes an increase in pressure on that side. The side of the cylinder moving with the air current therefor, is effected by a lowered pressure whereas the opposite side of the cylinder is affected by an increased pressure. The effect on the low pressure side is greater than that on the high pressure side.

This invention proposes to take advantage of this physical principle by rotating elongated and circular propeller blades about the central longitudinal axes thereof and to mechanically provide the air current necessary to the operation of this principle by revolving the blades about an axis extending transversely with respect to the axes at the blades to produce a force acting in the direction of the propeller axis.

For a better understanding of the invention, reference may now be had to the accompanying drawings, in which:

Figure 1 is a front elevational view of an aircraft embracing the principles of the invention.

Fig. 2 is a view partly in cross section and partly in elevation of the propeller shown by Figure 1 and is taken substantially in the plane of line 2—2 of Figure 1 looking in the direction of the arrows thereon.

Fig. 3 is a view of the propeller, partly in cross-section and partly in elevation, as the structure might appear substantially in the plane of line 3—3 of Fig. 2.

Fig. 4 is a view similar to Fig. 2 except for the illustration of a structure embracing a slightly different form of the invention.

Fig. 5 is a view similar to Fig. 2 illustrating another form of the invention.

Fig. 6 is a view taken substantially in the plane of line 6—6 of Fig. 5.

Fig. 7 is a fragmentary longitudinal sectional view through the end of one of the propeller blades and particularly the type of blade employed in the structure disclosed by Fig. 5.

Referring particularly to Fig. 1, the invention comprises an aircraft 10 consisting of a fuselage or body 11 from which wings 12 and 13 project laterally for supporting the craft in the air when once set in motion. The wings are braced in the present instant by struts 14 and 16 extending between the lower part of the fuselage and a region intermediate the opposite ends of the wings.

In the aircraft illustrated, the landing gear which ordinarily is employed in such structures is not shown. It is also to be understood that the invention has no particular relation to the structure of the aircraft disclosed other than for the purpose of illustration.

The front end of the fuselage supports an engine 17 provided with a crankshaft 18 on the outer extremity of which a propeller 19 is supported. A bearing such as that indicated at 21 may be provided for the crankshaft immediately adjacent the propeller, in order rigidly to support the outer extremity of the shaft. The shaft 18 has a reduced portion 22 immediately inwardly of and beyond the bearing 21 and on which is rotatably disposed the flanged bearing portion 23 of a beveled gear 24. The outer extremity of the reduced portion of the shaft 18 also is provided with a beveled gear 26 which, however, is non-rotatably secured on the shaft by the employment of splines and a nut indicated generally at 27. The two gears 24 and 26 are disposed on the shaft in opposite relation with the beveled portions of the gears disposed toward one another.

Between the gears 24 and 26 there is disposed, upon the reduced portion 22 of the shaft 18, a bushing and spacing collar 28 on the outer surface of which is rotatably mounted an oppositely disposed pair of flanged rings 31 and 32. The two rings are inseparably secured together, when the structure is assembled, by the employment of bolts or screws indicated at 33 and extending between the web-like side portions thereof.

Projecting radially outwardly through openings formed between the outer edges of the rings 31 and 32 are any desired number of studs 34 and 36 on the outer extremities of which are secured gears 37 and 38. The gears 37 and 38 are held in such position as to mesh with the gears 24 and 26 by nuts 39 and 41 secured on the inner extremities of the studs behind bearings 42 and 43 which are operatively disposed on flat portions of the rings 31 and 32, indicated generally at 44 and 46. The outer surfaces of the gears 37 and 38 have projecting therefrom integral annular flanges 48 on which are secured in any suitable manner the enlarged ends of slightly tapered, although substantially cylindrical blades 49 and 51. The blades 49 and 51 may be constructed of sheet aluminum, steel or other light material suitable for the purpose and, although circular in cross section and substantially cylindrical in formation from one end thereof to the other, these blades may be slightly tapered toward the outer extremities thereof to decrease somewhat the extent of centrifugal force upon the propeller and to vary slightly the linear speed of successive points upon the propeller blade surfaces.

When the engine 17 is started the shaft 18 and the gear 26 will be positively rotated at engine speed although, owing to the inertia of the blades 49 and 51 and other parts of the propeller structure and also by reason of the force required to revolve the propeller blades about the shaft 18 in opposition to the air thereabout and the load which such revolution creates, the blades at first revolve only very slowly about the shaft 18 although they rotate at an extremely high rate about their own longitudinal axes. Under such circumstances the gear 26 will be rotating in one direction at engine speed while the gear 24 may be rotating in the opposite direction and at a speed depending upon the variable factors previously enumerated. As the inertia of the propeller parts is overcome, however, the blades 49 and 51 will commence to revolve more rapidly about the shaft 18 and rotate less rapidly about their own axes, and as a result of which the gear 24 gradually will rotate at progressively decreasing speeds in the opposite direction to that of the rotation of gear 26 and then rotate in the direction of rotation of the gear 26 but at a rate substantially less than the rate of rotation of the gear 26. This is true because a considerable force always will be required to revolve the blades 49 and 51 in the air about the shaft 18 and this force is employed in opposing the rotation of the gear 24 and in rotating the blades around their own axes upon the gears 37 and 38.

Inasmuch as the work done in revolving the blades 49 and 51 about the shaft 18 includes the work done in overcoming the load involved in propelling the aircraft, the rate of revolution of the blades always will be a function of the aircraft load.

For example, if the useful load carried by the aircraft is small there will be a lesser force tending to oppose revolution of the blades 49 and 51 about the shaft 18 and, consequently, their rate of revolution about such central axis will more nearly approach engine speed, whereas their rate of rotation about the longitudinal axes thereof will be relatively low. Should the load on the aircraft increase, however, the force opposing the revolution of the blades about the shaft 18 also will increase and consequently there will be a corresponding decrease in the rate of revolution of the blades about the shaft 18 and a corresponding increase in their rate of rotation about their longitudinal axes. The rate of rotation of the propeller about the central axis or the shaft 18 always will be equal to the average speed of the gears 24 and 26, whereas the rate of rotation of the blades about their longitudinal axes will be equal to the product of the difference in speeds between the gears 24 and 26 and the ratio of the diameters of the gears 24 or 26 and 37 or 38. With a ship designed to carry heavy loads at a relatively low speed it will be apparent that the propeller will rotate slowly about its central axis but that the blades will rotate very rapidly about the longitudinal axes thereof. With a ship designed for light loads but to travel at a relatively high speed the propeller will rotate at a high rate of speed about its central axis and the blades at a relatively lower speed about the longitudinal axes of the blades. Likewise it is apparent that the propeller on a single ship will vary in its rate of rotation about its central axis in accordance with the useful load carried by the ship and will rotate faster around its central axis when the ship is lightly loaded than when heavily loaded.

In the structure illustrated by Fig. 4 there is provided, in addition to the structure already disclosed by Figs. 2 and 3, a mechanism 52 by which the rates of rotation of the propeller about its central axis and of the blades around their longitudinal axes may be manually controlled. By this mechanism any desired variation in the ratio between the drive shaft and propeller blade gears may be obtained. The mechanism may be constructed in any desired mechanical form as, for example, by the employment of any of the well known differential drives for obtaining relative speed between the gears 24 and 26 or, as illustrated, the mechanism may take the form of a brake adapted normally to decrease to any desired extent the rotation of the gear 24 relative to the rotation of the gear 26.

For example, with the propeller operating at no load, which theoretically might be obtained with the propeller rotating in a chamber from which air had been totally exhausted, the tendency would be for the gears 24 and 26 to rotate at equal speeds and for the blades not to rotate at all about their longitudinal axes. By applying the brake, however, the rate of rotation of the blades about their longitudinal axes may be increased to a maximum extent and the rate of rotation of the blades about the central axis may be decreased, correspondingly, by variably decreasing the rate of rotation of the gear 24. With the brake applied to such an extent as to entirely prevent the rotation of the gear 24 and with a two-to-one gear ratio, for example, it would be possible to obtain a condition wherein the engine of the aircraft would be driven at 4000 revolutions per minute, the propeller blades at 2000 revolutions per minute around the central axis of the propeller and at 4000 rotations per minute around their own longitudinal axes.

The blades 50 and 55 employed in this structure are tapered oppositely relative to the blades 49 and 51 embraced in the structure disclosed in the preceding figures. In other words the circular cross section of a blade, is increased uniformly or otherwise in the case of other than a straight taper away from the central axis of the propeller. This enlargement of the blade sections increases relative to the longitudinal axis of a blade, the linear speed of points successively more remote from the central axis of the propeller, as the linear speed of such points increases relative to the central axis.

Except for controlling the pitch effect and other operational characteristics of the propeller by the application of the brake 52, and except for the opposite taper of the propeller blades, the propeller is substantially identical to that disclosed by Figures 2 and 3 and the same reference numerals are employed thereon wherever corresponding parts are shown.

The brake 52 which is merely a preferred form of structure for positively controlling the operational characteristics of the propeller, comprises a drum 53 secured rigidly on the outer surface of the gear 24 and the external surface of which is engaged by a pair of brake bands 54 secured pivotally to the aircraft frame at one end and held together in spaced relation at the opposite end by a pin 56. A spring 58 may be employed between the spaced ends of the brake bands for holding the brake bands out of contact with the drum when the brake is released. One end of the pin 56 is connected eccentrically upon the outer surface of a circular cam 61 by a pin 59. A lever 62 secured to the cam 61 and connected pivotally to the end of a control rod 63 may be employed for manually operating the cam 61. By rotating the cam against the end of the band 52 the pin 56 may be made to vary the distance between the ends of the brake bands and consequently to variably clamp the brake bands against the drum 53.

In the structure disclosed by Fig. 5 the engine or propeller shaft 18 is threaded, as is indicated at 66, for engagement with an opening formed in the end of an eye member 67. To insure against the loosening of the shaft within the eye a lock nut and washer such as are indicated at 68 may be employed. The transverse opening formed in the eye is adapted to receive therein a cylinder 69 having spaced bearing rings 71 and 72 disposed on the exterior surface thereof between thrust springs 73 and 74 respectively. Recesses 76 and 77 are formed in the inner edges of the eye for receiving the rings 71 and 72 and against which ball bearings 78 are confined in races formed therebetween.

Inside the cylinder 69 there is disposed a cylindrical rotor 79 having a crescent-shaped recess 81 formed, intermediate the ends thereof, by an eccentric portion 82 of reduced diameter. Disposed in grooves 83 formed in parallel relation upon the surface of the reduced portion 82 and extending from one end thereof to another are motor blades 84, 86, 87 and 88 which, if desired, may be normally held in position against the inner surface of the cylinder 69 by springs 89 extending between opposite pairs of blades through openings 91 formed through the eccentric portion 82. Formed in the cylinder 69 and directly opposite the most shallow portion of the crescent-shaped recess 81 formed in the cylinder 71 is a motor inlet port 93 which communicates with an annular distribution port 94 formed directly therebeyond in the inner surface of the eye member 67. The distribution port normally is supplied with compressed air or other suitable fluid for operating the motor through an opening indicated at 94 and formed longitudinally of the shaft 18. The compressed air or other fluid may be supplied to the passage 94 by a pump constructed as an integral part of the engine and operated thereby or by the exhaust manifold or cylinders embraced in the engine employed in driving the shaft 18.

Exhaust ports 96 and 98 are provided in the rotor 79 in the region thereof immediately opposite a relatively shallow portion of the crescent-shaped groove 81 and these communicate with the atmosphere through ducts 99 and 101 respectively and which extend outwardly through the opposite end of the rotor 79. In order to insure the smooth operation of the rotor 79 within the cylinder 69 there is provided between the opposite ends of the cylinder and the reduced portions 102 and 103 formed at opposite extremities of the rotor, a pair of ball bearings 104 and 106 which also serve as thrust bearings to prevent longitudinal movement of the rotor within the cylinder.

The reduced end 102 of the rotor 79 has welded or otherwise rigidly secured thereto an enlarged head or disc 107 and on the outer end of which a propeller blade 108 similar to the blades 49 and 51 employed in the structure previously disclosed, is secured. The reduced end 103 at the opposite end of the rotor 69 is threaded for the reception of a nut 109 which is employed for the purpose of assembling and disassembling the rotor and cylinder structure. The end of the cylinder 69 opposite the head 107 also has a propeller blade 111 secured thereto in any suitable manner as, for example, the employment of threads and locking means suitable for retaining the blade against accidental dislocation. The outer ends of the propeller blades are provided with openings, as indicated at 112, for the purpose of permitting the fluid discharged by the ducts 99 and 101 to exhaust outwardly beyond the region of rotation of the blades and without disturbing the air normally effected during the rotation thereof. When air or other compressed fluid is supplied to the crescent-shaped recess 81 through the port 93 there will be created, by the tendency of the fluid to expand toward the exhaust ports 96 and 98, equal and opposite reaction forces affecting the rotor 79 and the cylinder 69 and which will cause the rotor to rotate in one direction and the cylinder to rotate in the opposite direction. Since the blade 111 is carried by the cylinder 69 and the blade 108 by the rotor 79, it is apparent that the two blades will be axially rotated in opposite directions. In this structure, it will be seen that the propeller blades are positively revolved at engine speed about the central axis of the propeller, although the blades may be independently rotated about their longitudinal axes by controlling the supply of compressed fluid through the passage 94. It is, therefore, possible with this structure during the flight of an aircraft to vary to any desired extent the pitch effect of the propeller merely by varying the supply of compressed fluid through the passage 94 and the rotation of the propeller blades about their longitudinal axes resulting therefrom.

While the structures herein disclosed constitute a preferred form and application of the invention, it is to be understood that there are numerous modified and equivalent structures also embracing the invention and within the scope of the appended claims.

We claim:

1. A power unit comprising an engine having an axis of rotation, a propeller operable by said engine and adapted to rotate centrally about the axis of rotation of said engine, said propeller having a plurality of blades also operatively connected to said engine so as to rotate about their longitudinal axes, and manually operable means for varying the relative rates of rotation of said propeller about said central axis and of said blades about their longitudinal axes.

2. A power unit comprising an engine having an axis of rotation, a propeller mounted on said engine for rotation thereby and centrally about said axis, said propeller having a plurality of blades operatively connected to said engine and adapted for rotation thereby about the longitudinal axes of said blades, and means for varying the rate of rotation of said blades about their longitudinal axes in inverse relation to the rate of rotation of the propeller about said central axis.

3. A power unit comprising an engine having a propeller, and fluid pressure actuated means for continuously rotating the blades of said propeller about their longitudinal axes.

4. A power unit comprising an engine having a propeller, said propeller comprising a plurality of blades adapted to rotate about their longitudinal axes, and fluid pressure actuated means operable by said engine for continuously rotating said blades.

5. A power unit comprising an engine having a propeller, said propeller having a plurality of blades with openings at the outer extremities thereof, and fluid pressure actuated means discharging through said openings for rotating the blades of said propeller through complete revolutions about their longitudinal axes.

6. A power unit comprising an engine having a propeller, said propeller having a plurality of blades of circular cross-sectional contour adapted to rotate continuously about their longitudinal axes, means associated with said engine for rotating said propeller about the central axis thereof and fluid pressure actuated means for rotating said propeller blades about their longitudinal axes.

7. A power unit comprising an engine having a propeller, manually actuated means for uniformly varying the rate of rotation of said propeller relative to the rate of rotation of said engine.

8. A power unit comprising an engine having a drive shaft, a propeller operatively connected to said drive shaft for rotating said propeller centrally about said drive shaft, said propeller having a plurality of blades rotatable about their longitudinal axes and operatively connected to said drive shaft for rotation thereby, and means responsive to the load on said propeller for varying the relative rates of rotation of said propeller about said drive shaft and of said blades about their longitudinal axes.

9. A power unit comprising a shaft and means for rotating said shaft, a propeller operatively connected to said shaft for rotating said propeller about the axis of rotation of said shaft, said propeller having a plurality of blades also operatively connected to said shaft for rotation thereby about their longitudinal axes, and manually operable brake means for varying the relative rates of rotation of said propeller about said central axis and of said blades about their longitudinal axes.

10. A power unit comprising a fixed member, a shaft, means for rotating said shaft with respect to said fixed member, a gear fixed to said shaft, a gear journaled on said shaft for rotation thereon, a differential ring journaled for rotation relative to said shaft, a gear journaled on said differential ring and engaging the gears journaled on and fixed to said shaft, a propeller blade fixed to the gear journaled on said differential ring, and brake means cooperating with the gear journaled on said shaft and with said fixed member for controlling the relative rates of rotation of said blades about the axis of said shaft and of rotation about its longitudinal axis.

11. A power unit comprising an engine, a hollow shaft rotatable by said engine, an eye member fixed to said shaft and provided with a transverse cylindrical opening therethrough, a cylindrical sleeve journaled for rotation in said opening, a propeller blade secured in axial alignment to said sleeve, a co-axial rotor arranged for rotation in said sleeve, a propeller blade secured in axial alignment to said rotor, and means for supplying fluid under pressure to said hollow shaft to said sleeve and rotor for rotating said sleeve in opposite directions with respect to the common axis thereof.

12. A power unit comprising an engine, a hollow shaft rotatable by said engine, an eye member fixed to said shaft and provided with a transverse cylindrical opening therethrough, a cylindrical sleeve journaled for rotation in said opening, a propeller blade secured in axial alignment to said sleeve, a co-axial rotor arranged for rotation in said sleeve, a propeller blade secured in axial alignment to said rotor, and means operable by said engine for supplying fluid under pressure to said hollow shaft to said sleeve and rotor for rotating said blades in opposite directions with respect to the common axis thereof, said blades being of hollow construction and provided with openings at the outer ends thereof for exhausting the fluid supplied for operating said sleeve and rotor.

ROGER K. LEE.
EDWARD F. ZAPARKA.